United States Patent
Briggs et al.

(10) Patent No.: US 10,752,039 B2
(45) Date of Patent: Aug. 25, 2020

(54) STRUCTURE OF IMPLEMENTING A DIRECTED SELF-ASSEMBLED SECURITY PATTERN

(71) Applicant: International Business Machines Corporation, Armonk, NY (US)

(72) Inventors: Benjamin David Briggs, Waterford, NY (US); Lawrence A. Clevenger, LaGrangeville, NY (US); Bartlet H. DeProspo, Goshen, NY (US); Michael Rizzolo, Albany, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/287,050

(22) Filed: Feb. 27, 2019

(65) Prior Publication Data
US 2019/0193452 A1 Jun. 27, 2019

Related U.S. Application Data

(63) Continuation of application No. 16/106,600, filed on Aug. 21, 2018, now Pat. No. 10,315,451, which is a continuation of application No. 15/055,835, filed on Feb. 29, 2016, now Pat. No. 10,150,323.

(51) Int. Cl.
| | |
|---|---|
| *G06K 9/00* | (2006.01) |
| *B42D 25/29* | (2014.01) |
| *B42D 25/355* | (2014.01) |
| *B42D 25/24* | (2014.01) |
| *G06F 16/93* | (2019.01) |

(52) U.S. Cl.
CPC ............ *B42D 25/29* (2014.10); *B42D 25/24* (2014.10); *B42D 25/355* (2014.10); *G06F 16/93* (2019.01); *G06K 9/00577* (2013.01); *G06K 2009/0059* (2013.01)

(58) Field of Classification Search
CPC ......... G06K 9/00577; G06K 19/06178; G06K 2009/0059; B42D 25/24; B42D 25/29; B42D 25/355
See application file for complete search history.

(56) References Cited

U.S. PATENT DOCUMENTS

| | | | |
|---|---|---|---|
| 6,035,914 A | 3/2000 | Ramsey et al. | |
| 6,053,406 A | 4/2000 | Litman | |
| 7,963,563 B2 | 6/2011 | Spencer et al. | |
| 9,202,744 B1 * | 12/2015 | Ban | H01L 21/76808 |
| 9,418,327 B1 | 8/2016 | Briggs et al. | |
| 9,818,249 B1 | 11/2017 | Fraser et al. | |
| 2004/0018297 A1 | 1/2004 | Davidson et al. | |
| 2005/0032226 A1 | 2/2005 | Natan | |

(Continued)

OTHER PUBLICATIONS

United States Notice of Allowance dated Jan. 28, 2019, in U.S. Appl. No. 16/106,600.

(Continued)

*Primary Examiner* — Li Liu
(74) *Attorney, Agent, or Firm* — Kevin Michael Jordan, Esq.; McGinn IP Law Group, PLLC

(57) ABSTRACT

A document including a Directed Self-Assembly (DSA) pattern including a unique and randomized pattern embedded on the document, where the DSA is formed by using two different-length polymer chains.

2 Claims, 13 Drawing Sheets

(56) References Cited

U.S. PATENT DOCUMENTS

| | | |
|---|---|---|
| 2005/0038756 A1 | 2/2005 | Nagel |
| 2008/0138604 A1 | 6/2008 | Kenney et al. |
| 2009/0274298 A1 | 11/2009 | Schmitt-Lewen et al. |
| 2013/0302358 A1 | 11/2013 | Collins et al. |
| 2015/0243008 A1* | 8/2015 | Isawa ................ G01N 23/2251 382/144 |
| 2015/0277237 A1 | 10/2015 | Sutani et al. |
| 2015/0339873 A1 | 11/2015 | Peinze et al. |
| 2016/0068429 A1 | 3/2016 | Terayama et al. |
| 2016/0283834 A1 | 9/2016 | Babbitt, III |

OTHER PUBLICATIONS

United States Office Action dated Nov. 15, 2018, in U.S. Appl. No. 16/106,600.
United States Office Action dated Sep. 6, 2018, in U.S. Appl. No. 16/106,600.
United States Notice of Allowance dated Aug. 2, 2018 in U.S. Appl. No. 15/055,835.
United States Office Action dated Jun. 18, 2018 in U.S. Appl. No. 15/055,835.
United States Office Action dated Apr. 9, 2018 in U.S. Appl. No. 15/055,835.
United States Office Action dated Dec. 14, 2017 in U.S. Appl. No. 15/055,835.
Hu, et al. "Directed self-assembly of block copolymers: a tutorial review of strategies for enabling nanotechnology with soft matter." Soft matter 10.22 (2014): 3867-3889.

* cited by examiner

34

35 →

36

35 →

STRUCTURE OF IMPLEMENTING A DIRECTED SELF-ASSEMBLED SECURITY PATTERN

CROSS-REFERENCE TO RELATED APPLICATIONS

The present application is a Continuation Application of U.S. patent application Ser. No. 16/106,600, filed on Aug. 21, 2018, which is based on U.S. patent application Ser. No. 15/055,835 filed on Feb. 29, 2016, now U.S. Pat. No. 10,150,323, issued on Dec. 11, 2018, the entire contents of which are hereby incorporated by reference.

BACKGROUND

The present invention relates generally to a structure of implementing a Directed Self-Assembly (DSA) pattern, and more particularly, but not by way of limitation, to a structure, method, and recording medium of implementing a Directed Self-Assembly (DSA) pattern for high value document anti-counterfeiting.

Conventional techniques for anti-counterfeiting measures for currency and legal documents are currently expensive and will not outpace counterfeiting procedures.

Some conventional techniques consider using false pigments that are not visible under normal optical wavelengths or to the human eye. However, the pigments are still detectable with an optical microscope and a specific radiation source available at minimal expense to potential counterfeiters.

Other conventional techniques utilize certain design features that are based upon the issuing mint or document. However, the ability to replicate and duplicate these features has been done in the past by counterfeiters.

Thus, there are technical problems in the conventional techniques that the probability of manipulation of the techniques is high due to a low difficulty in detection and replication of the patterns. Further, the conventional techniques utilize mediums that are easy to manipulate without considering the utilization of a proprietary pattern that is unique to each and every document or high value currency. Also, the patterns used in the conventional techniques require a rudimentary technology with low cost to verify the pattern and authenticate the pattern.

SUMMARY

In an exemplary embodiment, the present invention can provide an anti-counterfeiting system, including a production circuit configured to produce a Directed Self-Assembly (DSA) pattern including a unique pattern, an analysis circuit configured to analyze the unique pattern, an embedding circuit configured to embed the unique pattern on a document, and a verification circuit configured to verify that the unique pattern embedded on the document corresponds to the document.

Further, in another exemplary embodiment, the present invention can provide a document, including a Directed Self-Assembly (DSA) pattern including a unique pane embedded on the document.

Even further, in another exemplary embodiment, the present invention can provide an anti-counterfeiting method, including producing a Directed Self-Assembly (DSA) pattern including a unique pattern, analyzing the unique pattern, embedding the unique pattern on a document, and verifying that the unique pattern embedded on the document corresponds to the document.

There has thus been outlined, rather broadly, an embodiment of the invention in order that the detailed description thereof herein may be better understood, and in order that the present contribution to the art may be better appreciated. There are, of course, additional exemplary embodiments of the invention that will be described below and which will form the subject matter of the claims appended hereto.

It is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

The exemplary aspects of the invention will be better understood from the following detailed description of the exemplary embodiments of the invention with reference to the drawings.

DETAILED DESCRIPTION

Figure 1:
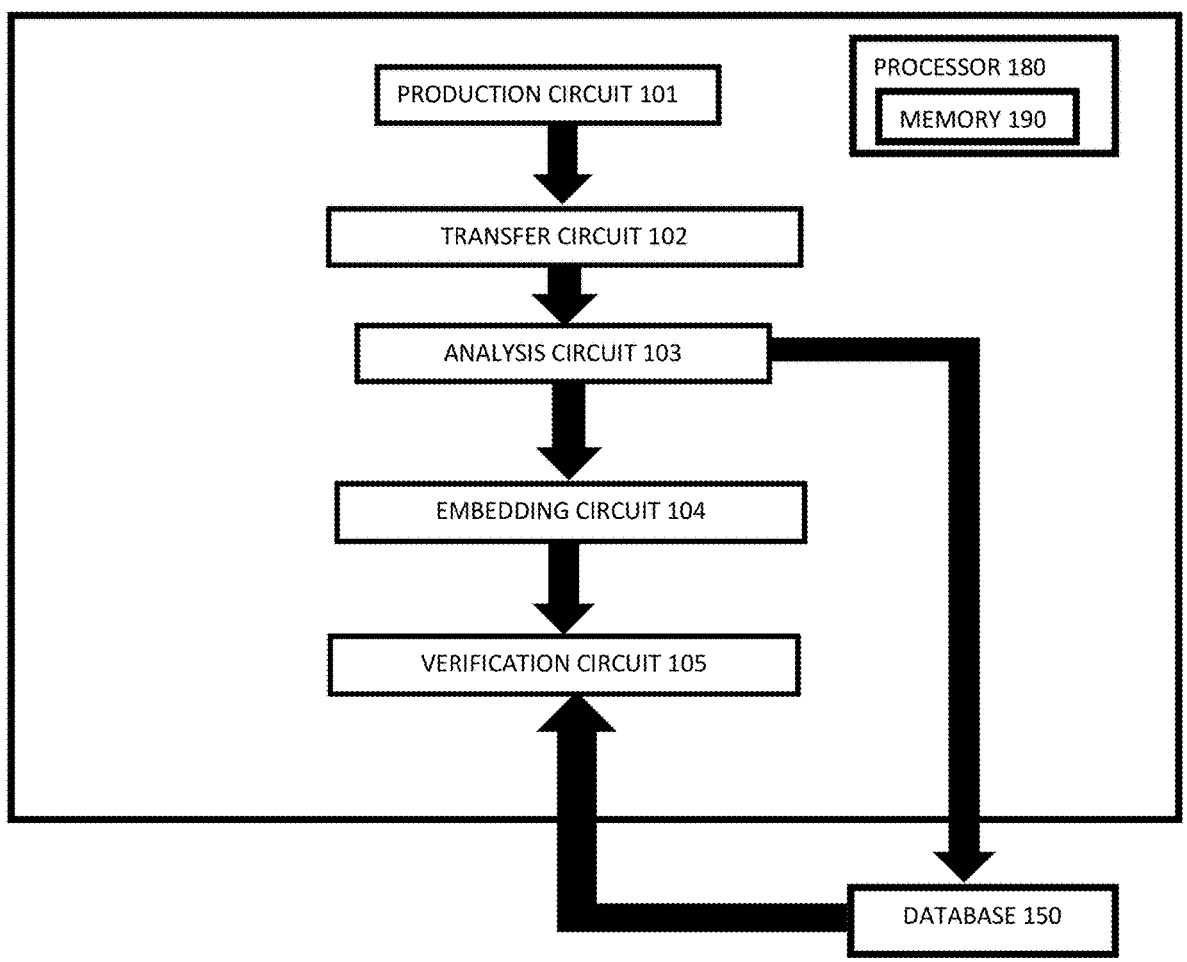
FIG. 1 exemplarily shows a block diagram illustrating a configuration of an anti-counterfeiting system 100.

The invention will now be described with reference to FIGS. 1-12, in Which like reference numerals refer to like parts throughout. It is emphasized that, according to co practice, the various features of the drawing are not necessarily to scale. On the contrary, the dimensions of the various features can be arbitrarily expanded or reduced for clarity. Exemplary embodiments are provided below for illustration purposes and do not limit the claims.

With reference now to FIG. 1, the anti-counterfeiting system 100 includes a production circuit 101, a transfer circuit 102, an analysis circuit 103, an embedding circuit 104, and a verification circuit 105. The anti-counterfeiting system 100 includes a processor 180 and a memory 190, with the memory 190 storing instructions to cause the processor 180 to execute each circuit of anti-counterfeiting system 100.

Although the anti-counterfeiting system 100 includes various circuits, it should be noted that an anti-counterfeiting system can include modules in which the memory 190 stores instructions to cause the processor 180 to execute each module of anti-counterfeiting system 100.

Also, each circuit can instead be made of a stand-alone device, unit, etc. that can be interconnected to cooperatively produce a transformation to a result.

Figure 10:
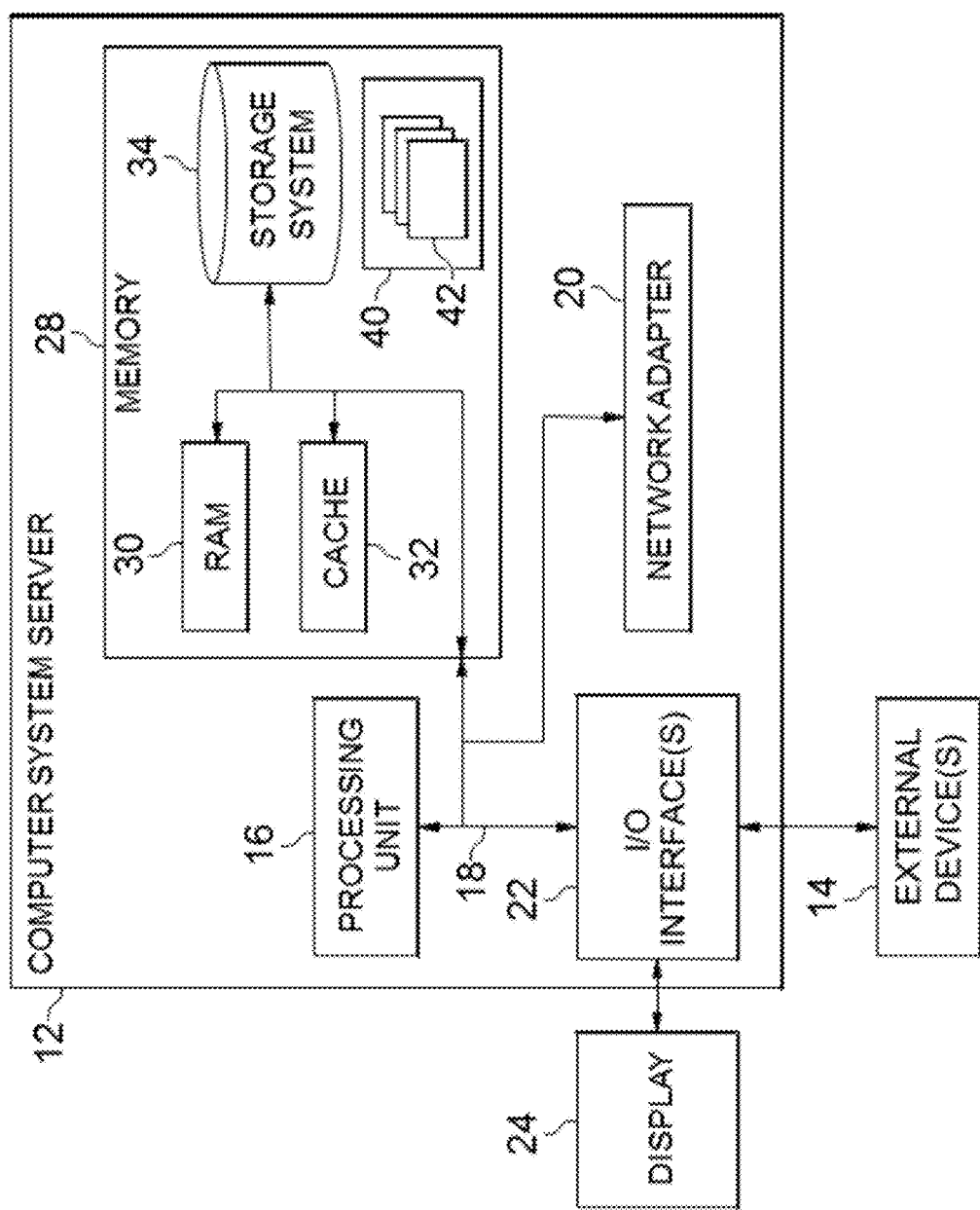
FIG. 10 depicts a cloud computing node according to an embodiment of the present invention.
Figure 11:
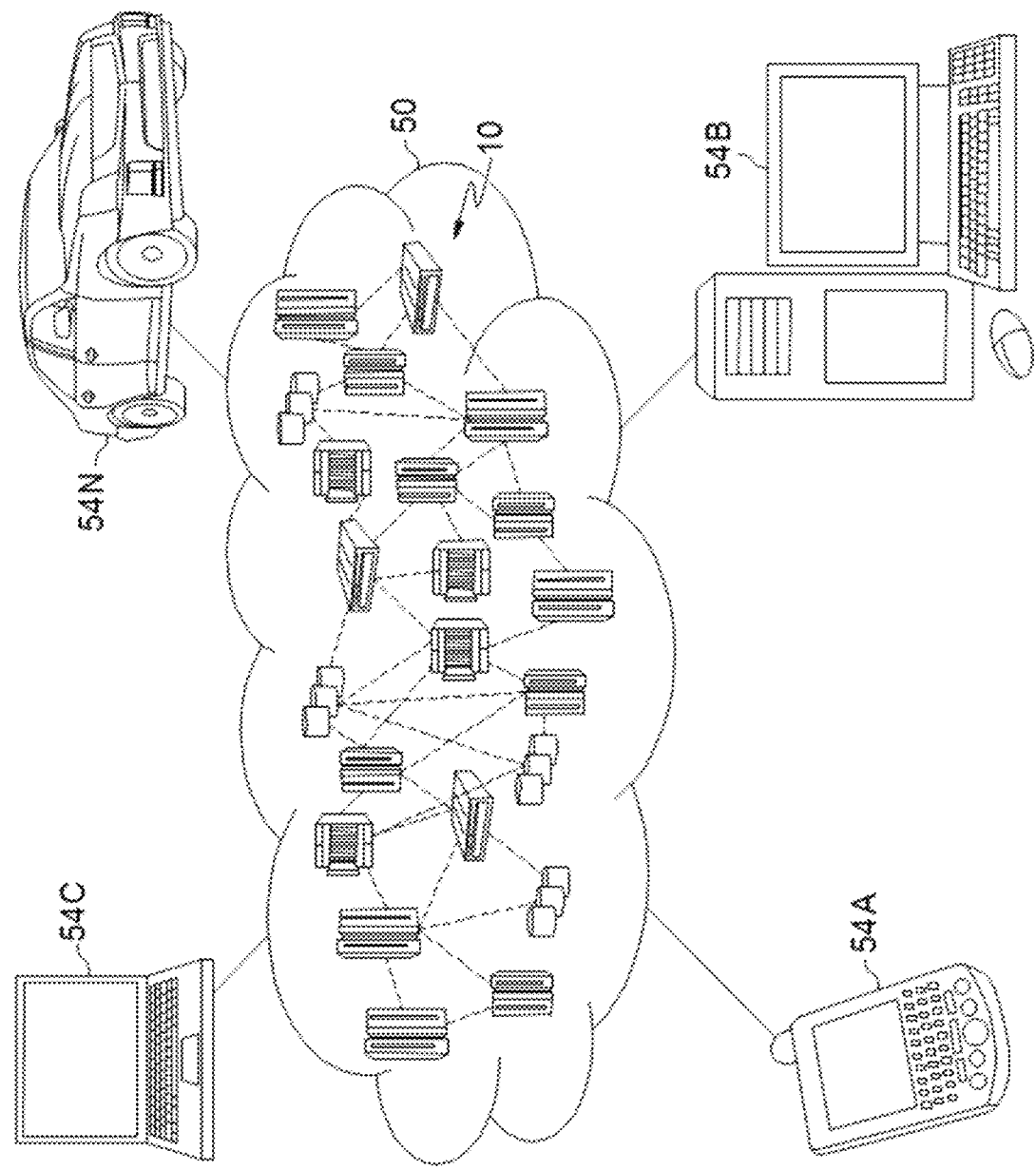
FIG. 11 depicts a cloud computing environment according to another embodiment, of the present invention.
Figure 12:
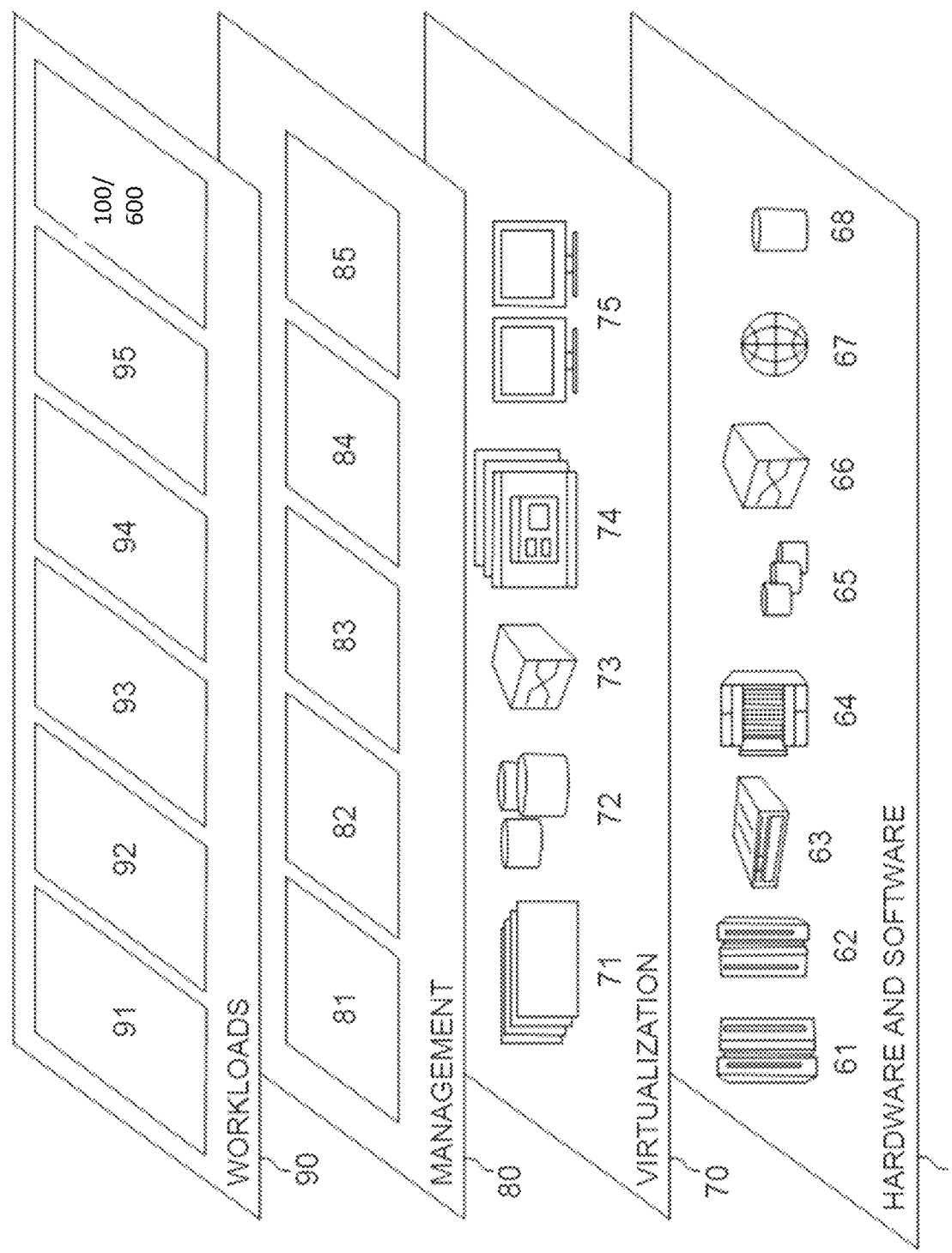
FIG. 12 depicts abstraction model layers according to an embodiment of the present invention.

Although as shown in FIGS. 10-12 and as described later, the computer system server 12 is exemplarily shown in cloud computing node 10 as a general-purpose computing circuit which may execute in a layer the anti-counterfeiting system 100 (FIG. 12), it is noted that the present invention can be implemented outside of the cloud environment.

With the use of these various devices, the anti-counterfeiting system 100 may act in a more sophisticated and useful fashion, and in a cognitive manner while giving the impression of mental abilities and processes related to knowledge, attention, memory, judgment and evaluation, reasoning, and advanced computation. That is, a system is said to be "cognitive" if it possesses macro-scale properties such as any of perception, goal-oriented behavior, learning/memory and action that characterize systems (i.e., humans) that all agree are cognitive.

Figure 3A:
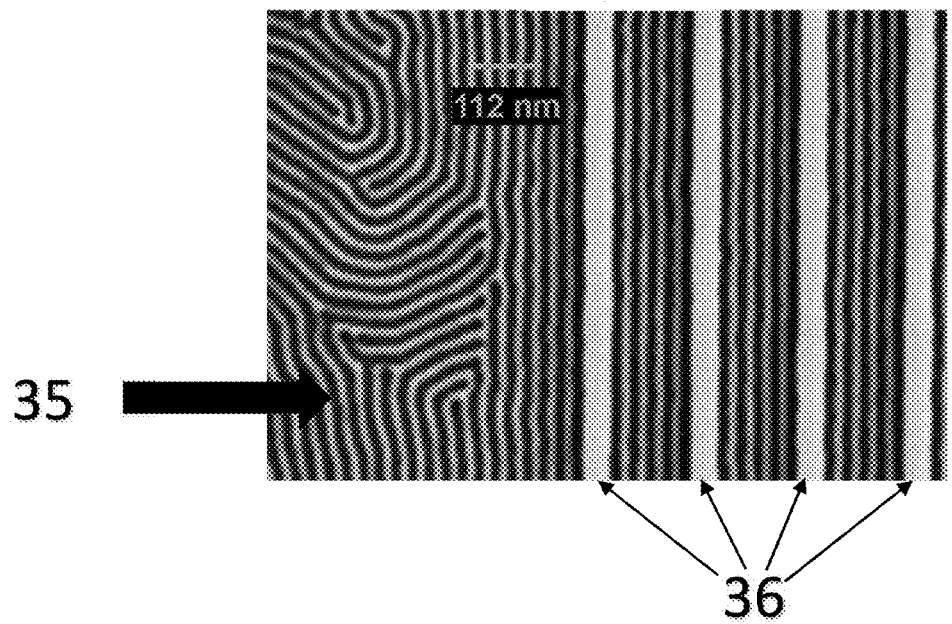
FIG. 3A exemplarily shows a Direct Self-Assembly (DSA) structure 34.

The production circuit 101 produces a Directed Self-Assembly (DSA) pattern 34 for anti-counterfeiting on a large scale as exemplarily shown in FIG. 3A. The DSA 34 can be formed by using two different length polymer chains. An alternating structure aligns end to end by solidifying the chains on a neutral substrate. One of the polymer chains is extracted to receive randomly oriented domains. The utilization of a guiding pattern 36 aligns the remaining polymer structure as shown on the right side of the FIG. 3A. However, if no guiding pattern 36 is used, randomization of structure creates a "fingerprint like" configurations, Once the desired random structure is formed, nanofabrication techniques (i.e., effectively using the polymer as a blocking mask) to metalize the random structure to create the pattern 35 are used. However, other techniques may be utilized to form the DSA 34.

The pattern 35 is produced such that the pattern 35 is unable to be viewed by the naked eye (i.e., without the use of an electron microscope). Further, each pattern 35 produced by the production circuit 101 is a unique pattern that requires a predetermined (e.g., 1000×) magnification. That is, each pattern 35 is different than each of the previous patterns 35 produced and the production circuit 101 does not manipulate the pattern at all, but instead the production circuit 101 produces a truly unique pattern 35 such that the unique pattern 35 is not susceptible to, for example, an intermediate serial number conversion.

Figure 3B:
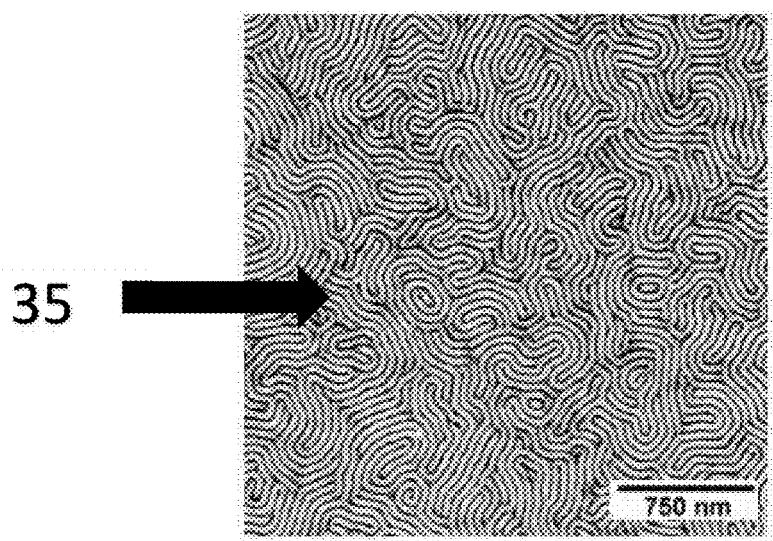
FIG. 3B exemplarily shows a pattern 35 of the Direct Self-Assembly (DSA) structure 34.
Figure 3C:
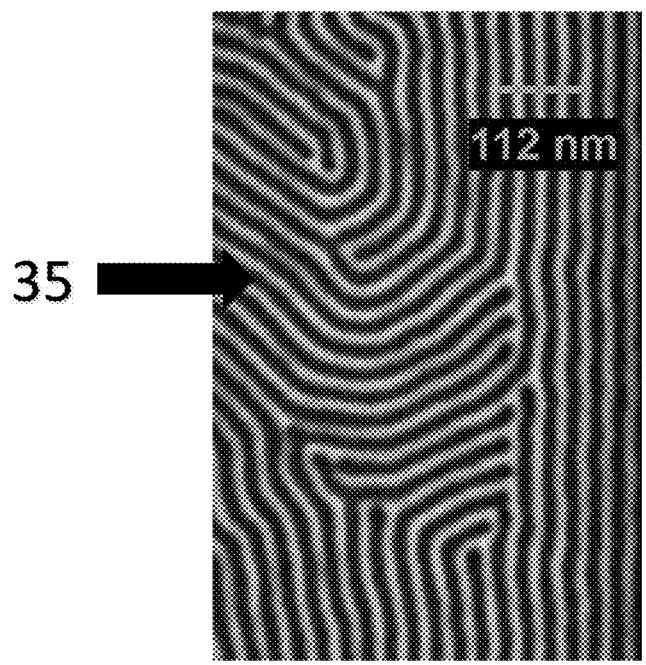
FIG. 3C exemplarily shows the pattern 35 of the Direct Self-Assembly (DSA) structure 34.

FIG. 3B depicts the pattern 35 viewed in a scale of 750 nm in which the black lines are "peaks" and the white lines are "valleys". FIG. 3C is a magnified version of FIG. 3B on a scale of 112 nm. A feature width (i.e., the width between "peaks") is in a range of 1 nm to 200 nm. More preferably, the feature width is in a range of 10 nm to 50 nm. That is, it requires a predetermined (e.g., 1000×) magnitude to view the patterns 35 and the patterns 35 are not viewable by the naked eye or even most viewing instruments.

Figure 4:
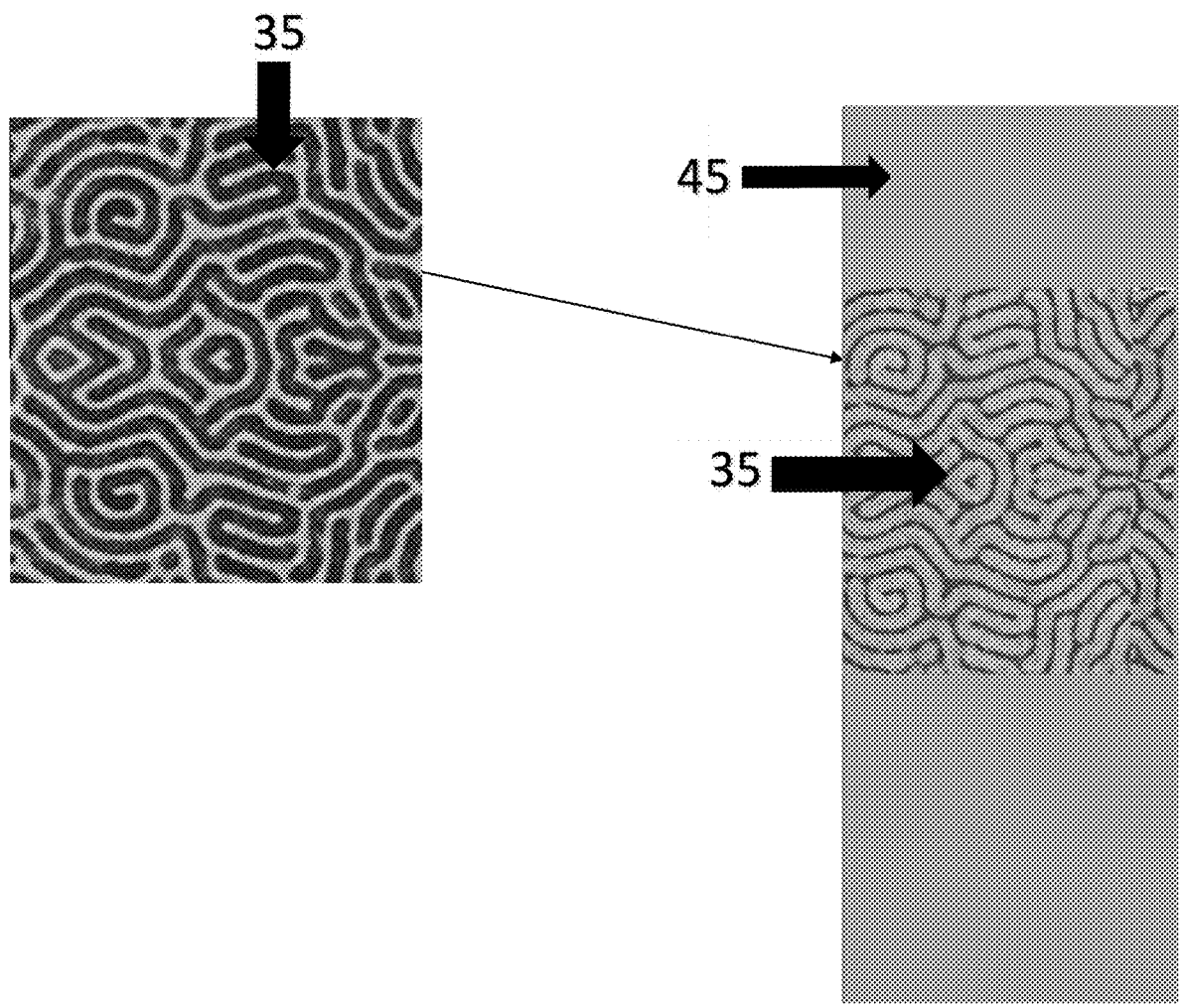
FIG. 4 exemplarily shows the pattern 35 being transferred onto a medium (e.g., a strip) 45.

The transfer circuit 102 transfers the pattern 35 produced by the production circuit 101 onto a strip 45 that can be processed in high volume as exemplarily shown in FIG. 4. The pattern 35 can be transferred onto the strip 45 such that the pattern 35 covers an entirety of the strip 45 or a portion of the strip 45.

The analysis circuit 103 analyzes the strip 45 including the transferred pattern 35 using a characterization technique suitable to the scale of the pattern 35. For example, the analysis circuit can use Scanning Electron Microscopy (SEM), a diffractometer, etc. and systematic imaging of embedded strips 45 in order to create a database 150 for later verification. The analysis circuit 103 assigns a unique identifier, based on the pattern 35, to each high value document 55 that the strip is embedded thereon. The unique identifier for the high value document 55 is stored in the database 150.

The analysis circuit 103 analyzes a portion of the pattern 35. That is, the pattern 35 can cover the entire strip 45, but preferably only a portion of the pattern 35 is analyzed and stored in the database 150. Therefore, even if a potential counterfeiter can find the pattern 35, it creates an additional layer of security by additionally requiring the counterfeiter to then identify which portion of the pattern 35 has been stored in the database 150. Of course, the analysis circuit 103 can also analyze the entire pattern 35.

Figure 5:
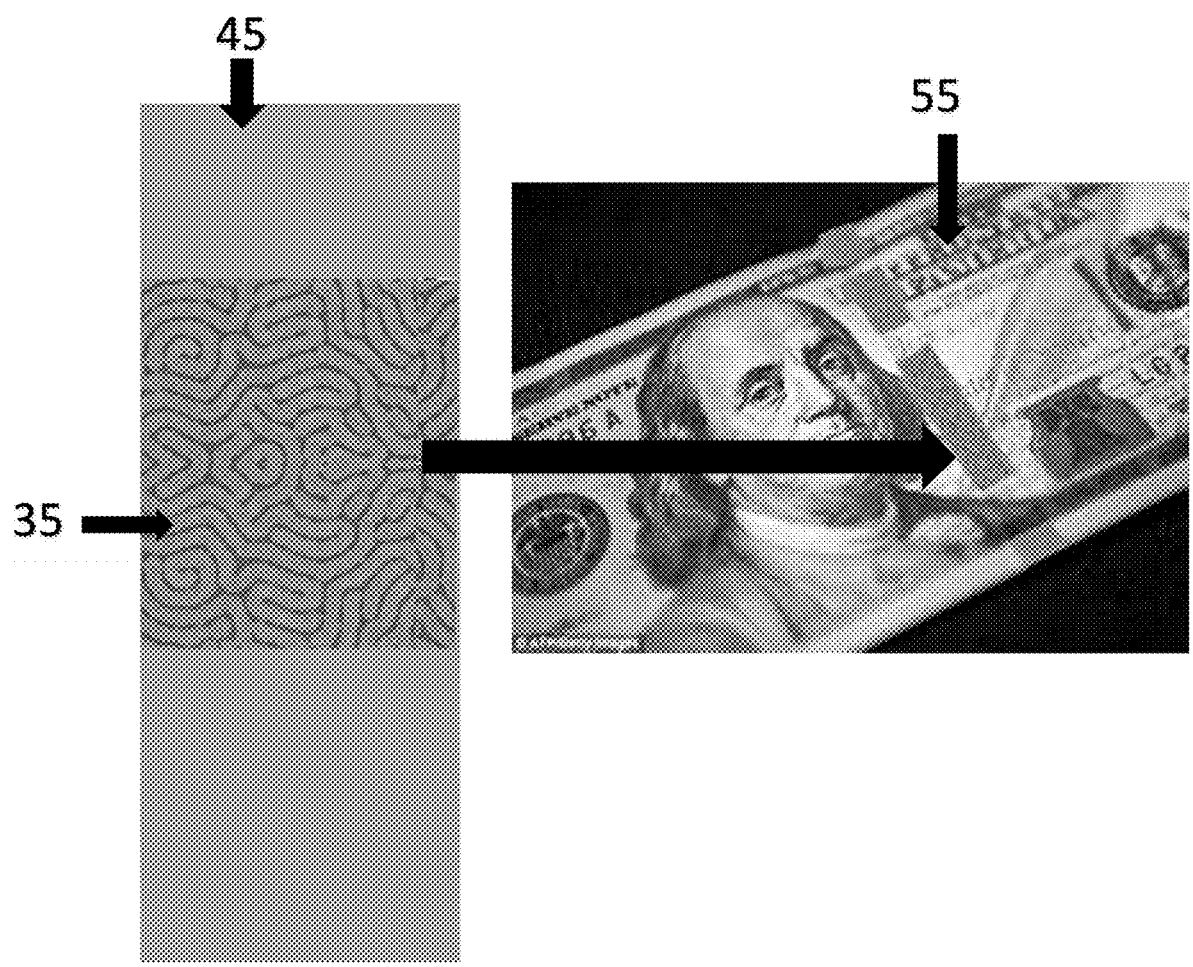
FIG. 5 exemplarily shows the pattern 35 being embedded into a high value document 55.

The embedding circuit 104 embeds the strip 45 onto the desired high value documents 55 such as passports, currency, deeds, stock certificates, legal instruments, etc. as exemplarily shown in FIG. 5. The embedding circuit 104 can embed the strip 45 onto the high value documents 55 before or after the analysis circuit 103 analyses the pattern 35.

The verification circuit 105 verifies that the desired high value documents 55 is not counterfeit by verifying that the unique identifier stored in the database 150 is correct (i.e., matches) for the particular high value document 55. For example, an operator would utilize a local analyzer to re-characterize the embedded strip 45, cross reference it with the database 150 for authentication, and output determination on legitimacy of document 55.

Each pattern 35 can include imperfections when the high value document 55 is in circulation from when the analyzing circuit 103 analyzed the pattern 35. The verification circuit 105 may learn errors within patterns 35 and may store the errors in the database 150, such that, as more patterns 35 are verified by the verification circuit 105, the more accurate verification can be even if there are errors or imperfections within the pattern 35. In this sense, the verification circuit 105 acts as a "cognitive" unit in that the verification circuit 105 learns, updates, and increases the knowledge of the anti-counterfeiting system 100.

Figure 2:
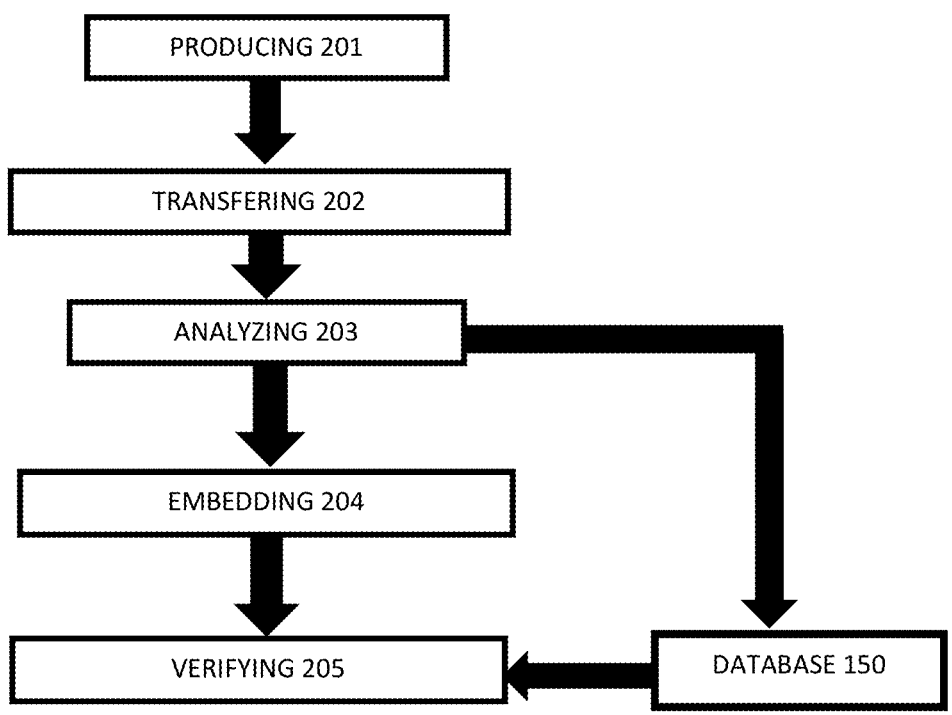
FIG. 2 exemplarily shows a high level flow chart for an anti-counterfeiting method 200.

FIG. 2 shows a high level flow chart for an anti-counterfeiting method 200.

Step 201 produces a Directed Self-Assembly (DSA) pattern 34 for anti-counterfeiting on a large scale, as exemplarily shown in FIG. 3A.

Step 202 transfers the pattern 35 produced by Step 201 onto a strip 45 that can be processed in high volume, as exemplarily shown in FIG. 4.

Step 203 analyzes the strip 45 including the transferred pattern 35 using a characterization technique suitable to the scale of the pattern 35, and assigns a unique identifier to be stored in the database 150, based on the pattern 35, to each high value document 55 that the strip is embedded thereon.

Step 204 embeds the strip 45 onto the desired high value document 55.

Step 205 verifies that the desired high value document 55 is not counterfeit by verifying that the unique identifier stored in the database 150 is correct for the particular high value document 55.

Figure 6:
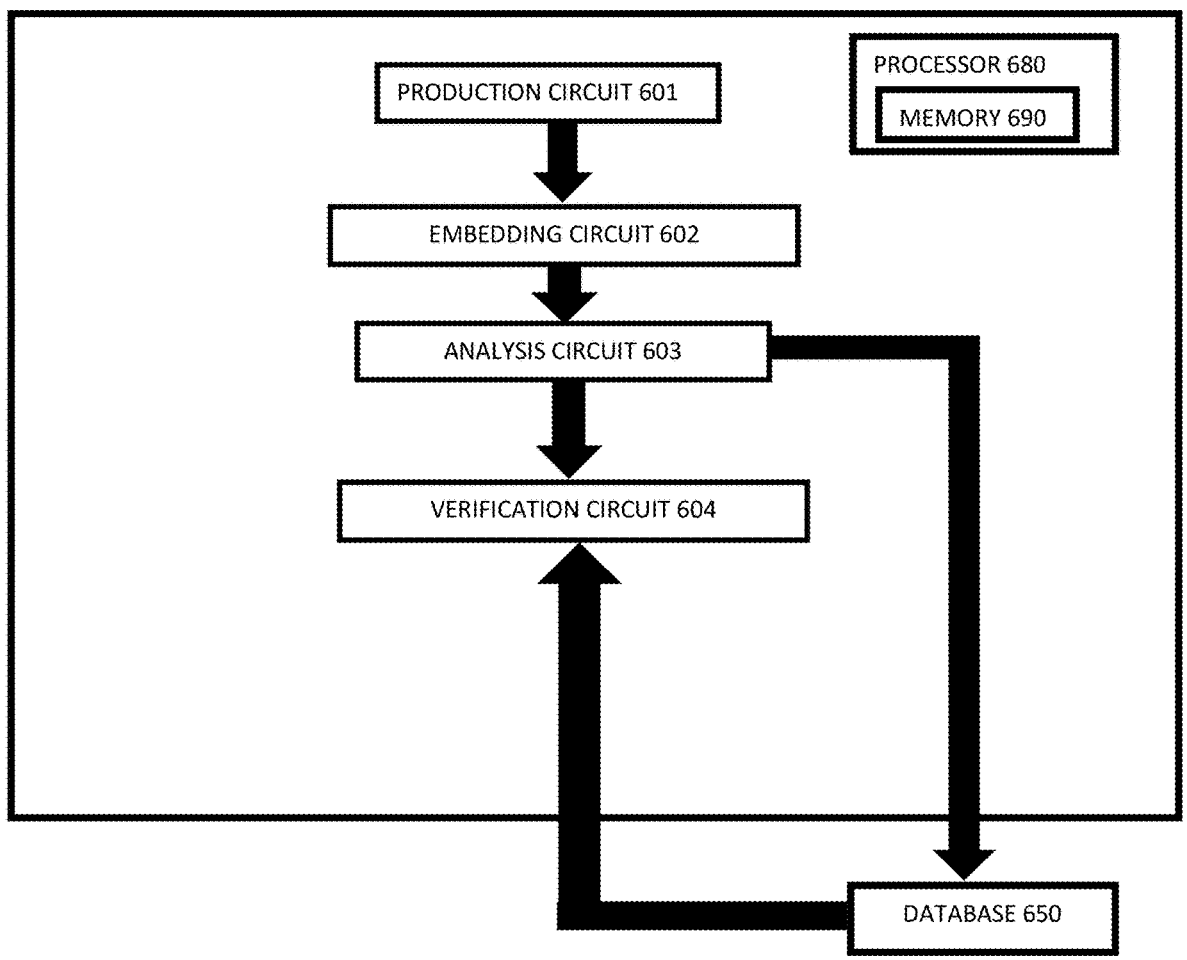
FIG. 6 exemplarily shows a block diagram illustrating a configuration of an anti-counterfeiting system 600 of a second embodiment.

With reference now to FIG. 6, the anti-counterfeiting system 600 of a second embodiment includes a production circuit 601, an embedding circuit 602, an analysis circuit 603, and a verification circuit 604. The anti-counterfeiting system 600 includes a processor 680 and a memory 690, with the memory 690 storing instructions to cause the processor 680 to execute each circuit of anti-counterfeiting system 600.

Although the anti-counterfeiting system 600 includes various circuits, it should be noted that an anti-counterfeiting system can include modules in which the memory 690 stores instructions to cause the processor 680 to execute each module of anti-counterfeiting system 600.

A difference between the first embodiment and the second embodiment is that the pattern 35 is transferred onto the strip 45 and then the strip 45 is embedded into the high value document 55 in the first embodiment, whereas, the pattern 35 is embedded into the entire high value document 55 via the fibers 65 in the second embodiment and the second embodiment includes an additional layer of security because the entire high value document 55 is covered with the pattern 35.

Also, each circuit can instead be a stand-alone device, unit, etc. that can be interconnected to cooperatively produce a transformation to a result.

Although as shown in FIGS. 10-12 and as described later, the computer system/server 12 is exemplarily shown in cloud computing node 10 as a general-purpose computing circuit which may execute in a layer the anti-counterfeiting system 600 (FIG. 12) it is noted that the present invention can be implemented outside of the cloud environment.

With the use of these various devices, the anti-counterfeiting system 600 may act in a more sophisticated and useful fashion, and in a cognitive manner while giving the impression of mental abilities and processes related to knowledge, attention, memory, judgment and evaluation, reasoning, and advanced computation. That is, a system is said to be "cognitive" if it possesses macro-scale properties such as any of perception, goal-oriented behavior, learning/memory and action that characterize systems (i.e., humans) that all agree are cognitive.

Figure 8:
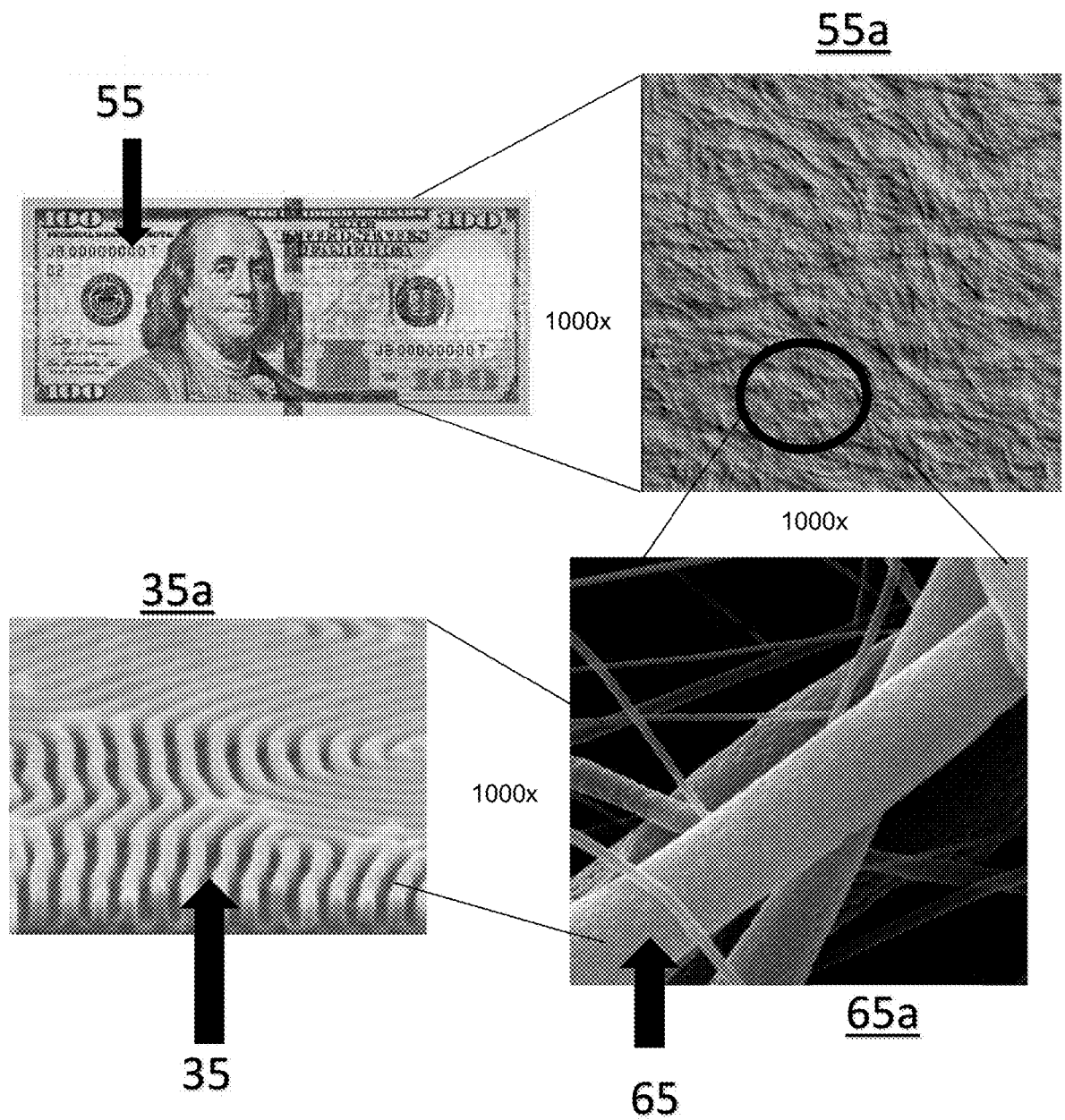
FIG. 8 exemplarily shows the second embodiment in which the pattern 35 is embedded into fibers 65 of the high value document 55.

The production circuit 601 produces a Directed Self-Assembly (DSA) pattern 34 for anti-counterfeiting on a large scale, as exemplarily shown in FIG. 3A. The DSA 34 is formed by using two different length polymer chains. An alternating structure aligns end to end by solidifying the chains on a neutral substrate. One of the polymer chains is extracted to receive randomly oriented domains. The utilization of a guiding pattern 36 aligns the remaining polymer structure as shown on the right side of the FIG. 3A. However, if no guiding pattern 36 is used, randomization of structure creates a "fingerprint like" configuration. Once the desired random structure is formed, nanofabrication techniques (i.e., effectively using the polymer as a blocking mask) to metalize the random structure to create the pattern 35 are used The embedding circuit 604 embeds the pattern 35 into the fibers 65 of the high value document 55. As shown in FIG. 8, 55a is a portion of the high value document 55, 65a is a depiction of the fibers 65 in the portion 55a of the high value document 55, 35a is a depiction of the pattern 35 embedded into the fibers 65.

The embedding circuit 604 embeds the pattern 35 into each and every fiber 65 of the high value document 55. Thus, the entire high value document 55 includes the pattern 35. That is, the pattern 35 is transferred onto the strip 45 and then the strip 45 is embedded into the high value document 55 in the first embodiment, whereas, the pattern 35 is embedded into the entire high value document 55 via the fibers 65 in the second embodiment.

Figure 9:
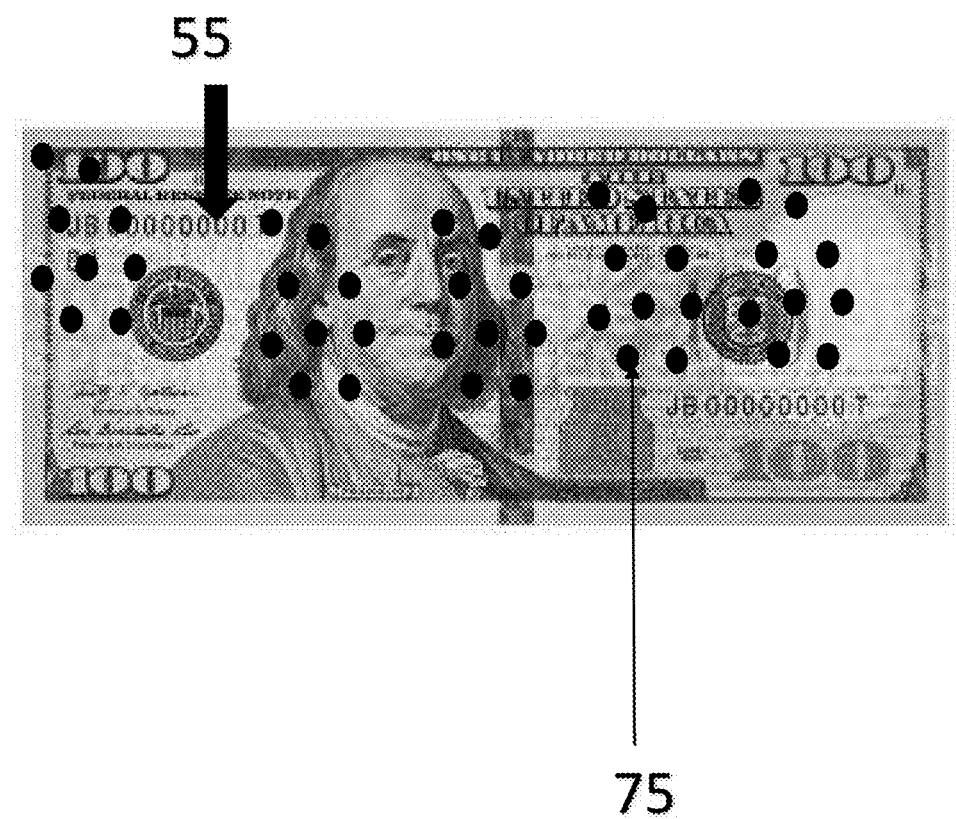
FIG. 9 exemplarily shows a second embodiment in which the high value document 55 has sites 75 for verification.

The analysis circuit 603 analyzes a portion 75 of the pattern 35 as shown in FIG. 9. That is, since the entire high value document 55 includes the pattern 35, the analysis circuit 603 can analyze any portion of the high value document 55 (i.e., as shown in FIG. 9 by the plurality of shaded circles 75) and stores a unique identifier associated with that portion 75 in the database 650. The second embodiment includes an additional layer of security because the entire high value document 55 is covered with the pattern 35. To be successful, a potential counterfeiter would need to scan the entire high value document 55 for the pattern 35 which was stored in the database and decide which portion 75 includes the unique identifier. This would be highly unlikely.

The verification circuit 605 verifies the desired high value document 55 is not counterfeit by verifying that the unique identifier stored in the database 650 is correct (i.e., matches) for the particular high value document 55.

Although the second embodiment embeds the unique pattern 35 onto the fibers 65 of the high value document 55, the strip 45 including the unique pattern 35 of the first embodiment can also be included on the high value document 55. That is, the unique pattern 35 can be embedded into the fibers 65 of the high value document 55 and transferred onto the strip 45 of the high value document 55.

Figure 7:
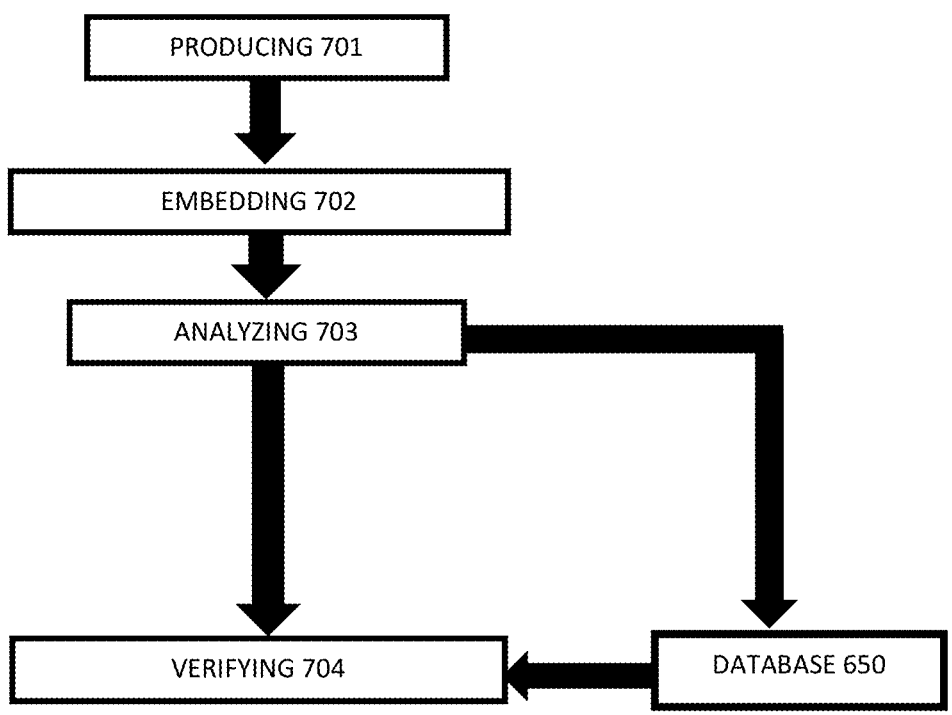
FIG. 7 exemplarily shows a high level flow chart for an anti-counterfeiting method of the second embodiment.

FIG. 7 shows a high level flow chart for an anti-counterfeiting method 700 of a second embodiment.

Step 701 produces a Directed Self-Assembly (DSA) pattern 34 for anti-counterfeiting including a unique pattern 35.

Step 702 embeds the pattern 35 produced in Step 701 into the fibers 65 of the high value document 55.

Step 703 analyzes a portion 75 of the pattern 35 as shown in FIG. 9 and stores a unique identifier associated with that portion 75 of the high value document 55 in the database 650.

Step 704 verifies the desired high value document 55 is not counterfeit by verifying that the unique identifier stored in the database 650 is correct (i.e., matches) for the particular high value document 55.

Exemplary Hardware Aspects, Using a Cloud Computing Environment

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client circuits through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 10, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop circuits, multiprocessor systems, microprocessor-based systems, set top boxes, programmable consumer electronics, network PCs, minicomputer systems, mainframe computer systems, and distributed cloud computing environments that include any of the above systems or circuits, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing circuits that are linked through a communications network. In a distributed cloud computing environment, program modules may be located in both local and remote computer system storage media including memory storage circuits.

As shown in FIG. 10, computer system/server 12 in cloud computing node 10 is shown in the form of a general-purpose computing circuit. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated, graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media, Such media may be any available media that is accessible by computer system/server 12, and it includes both volatile and non-volatile media, removable and non-removable media.

System memory 28 can include computer system readable media in the form of volatile memory; such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external circuits 14 such as a keyboard, a pointing circuit, a display 24, etc.; one or more, circuits that enable a user to interact with computer system/server 12; and/or any circuits (e.g., network card, modem, etc.) that enable computer system/server 12 to communicate with one or more other computing circuits. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, circuit drivers, redundant processing units, external disk drive arrays, RAID systems, tape drives, and data archival storage systems, etc.

Referring now to FIG. 11, illustrative cloud computing environment 50 is depicted. As shown, cloud computing environment 50 comprises one or more cloud computing nodes 10 with which local computing circuits used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing circuit. It is understood that the types of computing circuits 54A-N shown in FIG. 11 are intended to be illustrative only and that computing nodes 10 and cloud computing environment 50 can communicate with any type of computerized circuit over any type of network and/or network addressable connection (e.g., using a web browser).

Referring now to FIG. 12, a set of functional abstraction layers provided by cloud computing environment 50 (FIG. 11) is shown. It should be understood in advance that the components, layers, and functions shown in FIG. 12 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage circuits 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, more particularly relative to the present invention, the anti-counterfeiting system 100 and the anti-counterfeiting system 600 described herein.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. An article of manufacture, comprising:
 a Directed Self-Assembly (DSA) pattern embedded on the article of manufacture,
 wherein the DSA pattern is formed by using two different-length polymer chains,
 wherein the article of manufacture comprises one of:
 a passport;
 a currency; and
 an identification card.

2. A computer program product for analyzing a Directed Self-Assembly (DSA) pattern embedded on the article of manufacture, the DSA pattern being formed by using two different-length polymer chains, the computer program product comprising a non-transitory computer-readable storage medium having program instructions embodied therewith, the program instructions executable by a computer to cause the computer to perform:
 reading the DSA pattern embedded on an article of manufacture, the article of manufacture comprising the DSA pattern; and
 authenticating the article of manufacture as authentic based on a comparison between the DSA pattern and a database of DSA patterns.

* * * * *